Sept. 6, 1949.   J. ORLANDO   2,481,336
ROTARY DRUM CHEESE GRATER
Filed April 30, 1949

INVENTOR
Joseph Orlando
BY
ATTORNEY

Patented Sept. 6, 1949

2,481,336

UNITED STATES PATENT OFFICE 2,481,336

ROTARY DRUM CHEESE GRATER

Joseph Orlando, Brooklyn, N. Y.

Substituted for application Serial No. 635,716, December 18, 1945. This application April 30, 1949, Serial No. 90,743

1 Claim. (Cl. 146—92)

This invention relates to a cheese grinder, and in particular to a home or portable cheese grinder. This is a substitute for my abandoned application, filed on December 18, 1945, Serial Number 635,716.

The purpose of this invention is to provide a cheese grinder which is adapted for home use and which is portable and adapted to be readily transported from one place to another. The previous cheese grinders have been relatively large and heavy machinery adapted for only permanent or semi-permanent installation.

Accordingly, it is an object of the invention to provide a cheese grinder of relatively small size, and yet one which is capable of performing a fully satisfactory job.

It is a further object of this invention to provide an efficient and satisfactory home cheese grinder.

It is an additional object of this invention to provide a cheese grinder which is adapted to be easily carried from one place to another with a minimum of inconvenience.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
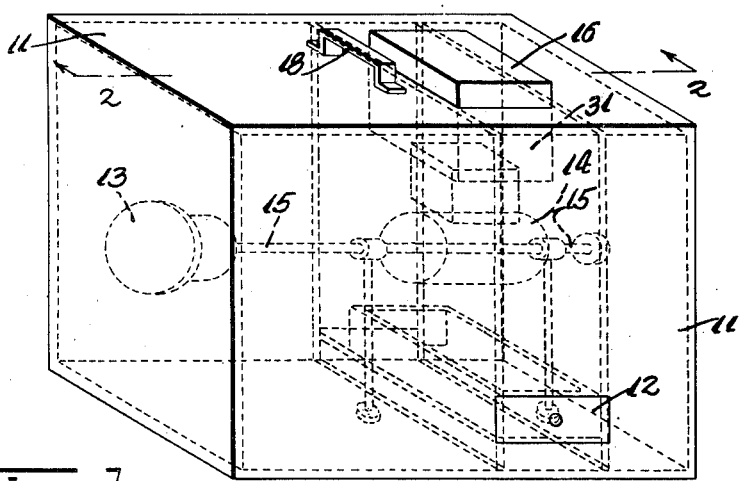
Fig. 1 is a perspective view of the cheese grinder according to one embodiment of the invention.

The cheese grinder 10 shown in Fig. 1 is mounted in a small and compact case 11 which preferably measures about twelve inches or less in its longest dimension. This is deliberately constructed in a minimum of space, preferably of light materials such as, for example, aluminum, magnesium, and alloys of these and other light metals, as well as plastics and other synthetic resins, composition boards, or the like.

Within this case 11 is mounted a motor 13, for example, a small electric motor, a spring motor, or the like, operating grinding or cutting blades 14 through shaft 15. Below these blades 14 is positioned a drawer 12, or the like adapted to receive the ground cheese and to provide for the removal thereof. Positioned above the blades 14 is a cheese propelling block 16 which serves to force the cheese against the blades. The blades 14, block 16 and drawer 12 are optionally enclosed and separated from the remainder of the operating parts of the grinder by walls 27' (see Fig. 2) which prevent scattering and loss of the cheese, and which prevent contamination thereof.

The block 16, according to this embodiment is a relatively heavy rectangular block adapted to weigh heavily on cheese positioned therebelow, thereby strongly forcing it downwards.

The top of the grinder is suitably and satisfactorily provided with a suitcase type handle 18 by means of which it is readily adapted to be portable.

Figure 2:
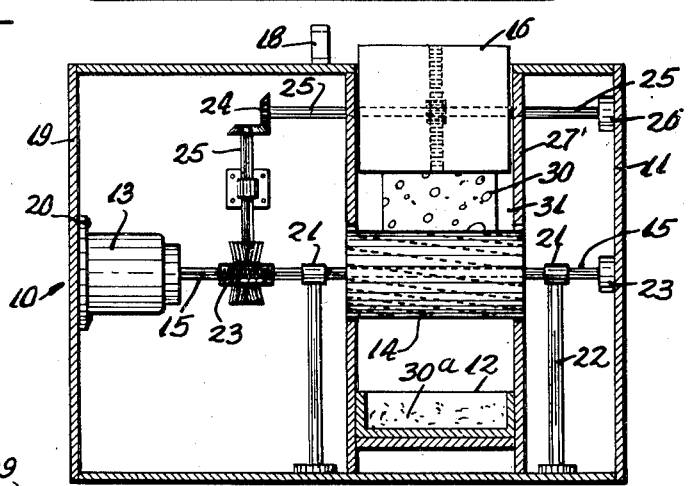
Fig. 2 is a cross section of the grinder shown in Fig. 1, taken along the line 2—2.

In Fig. 2, the inner construction of the grinder 10 is illustrated. The motor 13 is conventionally mounted on the left hand wall 19 of the grinder by means of screws 20 or the like. Extending from the motor and rotated thereby is a drive shaft 15 which is journalled in bearings 21 supported on posts 22, and which optionally terminates in and is further supported by end bearing 23 mounted on the opposite wall. The drive shaft is operably connected to a cutting or blade assembly 14 which is adapted to grind the cheese into small particles. The blade assembly may suitably be any one of a number of cutting and grinding means such as, for example, rotary blades, a rotary cylindrical roughened surface, reciprocating blades, or the like. As a matter of convenience, and to avoid complicating the drawings with a multitude of figures which would serve only to cloud the true nature of the invention, these blades are shown only as a rotary roughened surface.

In the embodiment shown in Fig. 1, there is no power drive operably connected to the cheese propelling block, and accordingly the embodiment shown in Fig. 2 differs therefrom in that such a power drive is herein illustrated. Power is supplied to this block 16 through worm gear 23 mounted on drive shaft 15 and through bevelled gears 24 and power shafts 25 and end bearing 26. The gear ratio is so selected (as indicated by the choice of a worm gear for the purpose) that the block is caused to move slowly downward while the blades are rotating or vibrating comparatively rapidly.

In Fig. 2, the drawer 12 which is slidably positioned in the walls 17 surrounding the cutting and feed portions of the machine, is partially filled with ground cheese 30ª which has been removed from the cut of cheese 30 positioned between the blades 14 and the cheese propelling block 16.

Figure 3:
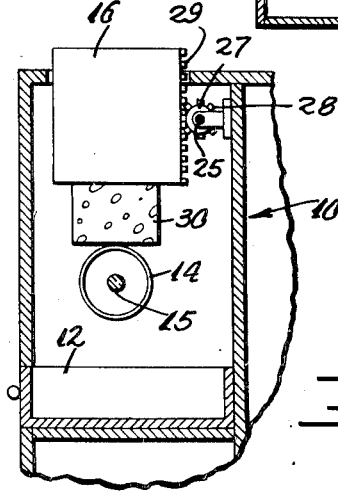
Fig. 3 is a side elevation of the cheese propelling block according to the embodiment shown in Fig. 2, illustrating the operation thereof.

Fig. 3 shows a relationship of parts according to which the cheese propelling block 16 is forced against the cheese 30. This apparatus, which may be replaced by other devices familiar to those skilled in the art, comprises a gear 27 mounted on shaft 25 and having teeth 28 adapted to engage with track 29 mounted on the block 16.

In all figures a chamber 31 between the cutting blades 14 and block 16 is adapted to receive a piece of cheese optionally about ¼ or ½ pound, thereby adapting and limiting the machine to non-commercial use.

In the use and operation of the cheese grinder, the cheese propelling block 16 is removed and a cut of cheese 30 is inserted. The cheese propelling block is then placed on the top of the cheese and the power in motor 13 is turned on. Blades 14 are thereby driven, and the coaction between these moving blades and the force of block 16 propelling the cheese against the block causes the cheese to be rapidly ground.

When the embodiment shown in Fig. 2 is used, wherein the cheese propelling block is positively driven against the cheese, this block is removed either by releasing this block from the driving gear 27 by conventional means not shown in the drawings or by reversing the direction of motor 13. The cheese is then introduced and the machine operated as before.

The new machine is rapid and efficient, and is readily portable. It may be used, and immediately placed in a small, out of the way place where it can be stored until it is once again used. It is economical to use and operate, and is in all ways adapted for home use.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A portable cheese grinder, comprising a housing provided with opposing vertical walls having circular openings therein, a drum having external helical cheese cutting means disposed horizontally between the vertical walls with its ends projecting into the openings thereof, a shaft extending through the drum, bearings for supporting the shaft, means for rotating the shaft, the shaft having a worm thereon located outwardly of said walls, a vertical shaft having a worm gear engaging the worm, a cheese feeding block positioned between the side walls directly over the drum, a gear toothed rack on said feeding block, a horizontal shaft having a gear to engage said rack, and gearing between the vertical shaft and said last-named horizontal shaft, whereby the feeding block will be forced downwardly to increase pressure on cheese positioned over the drum at the same time the drum is rotated.

JOSEPH ORLANDO.

REFERENCES CITED

The following references are of record in the file of this patent:

UNITED STATES PATENTS

| Number | Name | Date |
|---|---|---|
| 445,769 | Chamberlain | Feb. 3, 1891 |
| 622,048 | Hunsinger | Mar. 28, 1899 |
| 719,881 | Samuelson | Feb. 3, 1903 |
| 1,027,218 | Shaver | May 21, 1912 |
| 1,600,123 | Milici et al. | Sept. 14, 1926 |
| 2,208,335 | Kurtz | July 16, 1940 |